(12) United States Patent
Bussan et al.

(10) Patent No.: US 6,965,763 B2
(45) Date of Patent: Nov. 15, 2005

(54) EVENT COORDINATION IN AN ELECTRONIC DEVICE TO REDUCE CURRENT DRAIN

(75) Inventors: Christopher F. Bussan, Crystal Lake, IL (US); Joseph M. Hansen, Williams Bay, WI (US); Charles P. Binzel, Bristol, WI (US)

(73) Assignee: Motorola, Inc., Schaumburg, IL (US)

( * ) Notice: Subject to any disclaimer, the term of this patent is extended or adjusted under 35 U.S.C. 154(b) by 461 days.

(21) Appl. No.: 10/074,114

(22) Filed: Feb. 11, 2002

(65) Prior Publication Data

US 2003/0153368 A1 Aug. 14, 2003

(51) Int. Cl.[7] ................................................ H04B 1/16
(52) U.S. Cl. ................ 455/343.4; 455/574; 455/343.1; 455/343.2; 455/572; 455/573; 455/127.1; 455/127.5; 713/320; 713/500; 713/600
(58) Field of Search ................................ 455/572–574, 455/550.1, 566, 515, 343.1–343.6, 127.1, 455/127.5; 713/320, 500, 600

(56) References Cited

U.S. PATENT DOCUMENTS

| | | | | |
|---|---|---|---|---|
| 5,416,435 A | * | 5/1995 | Jokinen et al. ............. | 327/113 |
| 5,902,352 A | * | 5/1999 | Chou et al. ................. | 718/102 |
| 6,016,312 A | * | 1/2000 | Storm et al. ................ | 370/311 |
| 6,189,106 B1 | * | 2/2001 | Anderson ................... | 713/300 |
| 6,212,398 B1 | * | 4/2001 | Roberts et al. ............. | 455/502 |
| 6,473,607 B1 | * | 10/2002 | Shohara et al. ........... | 455/343.1 |
| 6,735,454 B1 | * | 5/2004 | Yu et al. ..................... | 455/574 |
| 6,741,836 B2 | * | 5/2004 | Lee et al. ................... | 455/41.2 |
| 6,816,977 B2 | * | 11/2004 | Brakmo et al. ............. | 713/323 |
| 6,865,683 B2 | * | 3/2005 | Taylor et al. ............... | 713/310 |
| 2004/0225907 A1 | * | 11/2004 | Jain et al. ................... | 713/320 |
| 2005/0164637 A1 | * | 7/2005 | Pattabiraman et al. ..... | 455/41.2 |

* cited by examiner

*Primary Examiner*—Temica M. Beamer
*Assistant Examiner*—Anthony S. Addy
(74) *Attorney, Agent, or Firm*—Brian M. Mancini; Randall S. Vaas

(57) ABSTRACT

A method of coordinating events in a microprocessor-based electronic device having a sleep mode to reduce current drain includes a first step of determining a list of times to perform associated operating system events requiring a wake-up period for the device. A next step includes establishing a timing of fixed events wherein the electronic device enters a wake-up period to perform the fixed events. A next step includes delaying the time for an operating system event to coincide with a fixed event such that the electronic device utilizes one coincident wake-up period to perform both of the operating system event and the fixed event. This removes the current drain associated with entering and exited an additional sleep period.

16 Claims, 2 Drawing Sheets

EVENT COORDINATION IN AN ELECTRONIC DEVICE TO REDUCE CURRENT DRAIN

FIELD OF THE INVENTION

The present invention relates generally to communication devices such as portable radiotelephones. More particularly, the present invention is directed to operating a communication device to reduce current drain.

BACKGROUND OF THE INVENTION

In a battery-operated device, such as a portable communication device, methods can be utilized to put the device in a low power mode and reduce current drain so that the battery charge lasts longer. In a Global System for Mobile (GSM) communication cellular phone, one technique involves entering a "deep sleep" state where much of the hardware is shutdown and the high-speed clock is turned off. The high speed clock source requires significant power to operate, and circuits consume more current as the driving clock speed increases. In "deep sleep", the high speed clock source is powered-off for a period of time. During this time, a slow speed clock source is used, and is only drives a limited amout of circuitry. Many microprocessor-based products other than GSM phones have similar states they enter where certain hardware portions and clocks are powered off and must be powered on and become stable before the system can operate again. For example, microprocessors can turn off portions of themselves following low power mode instructions such as wait/doze/stop. In regards to communication functions, a paging mode can be defined for a battery-operated mobile radio, such as a cellular radiotelephone. In this mode, when the radiotelephone is in an idle mode (i.e., not engaged in a call), the radiotelephone does not continuously monitor a paging channel but generally remains in a low power, idle state. In the idle state, the radiotelephone wakes up only during predetermined time slots to see if there is an incoming call, as indicated on a paging channel, or to process some other condition, such as a user input. The goal of low power modes and paging mode operation is to reduce the on time of the radio to a minimum and to power down as much of the radio as possible during sleep periods.

A cellular phone is typically in an operating mode where it must periodically wake-up from deep sleep to read a paging block or perform some other physical layer (layer1) event. In GSM phones, there is a procedure followed to get into deep sleep and a procedure to get out of deep sleep. The procedures involve some delay when entering deep sleep and a significant delay when exiting deep sleep primarily to allow the hardware to warm-up and the clock source to become stable. During these delay times, and in addition to the wake-up periods, the current drain of the phone is increased over that during a sleep mode. Therefore, it is desirable to avoid entering and exiting deep sleep and experiencing the associated additional high current drain delay times. Moreover, if some processing is required at a time not coincident with a paging block operation, for example, this might also prevent entering deep sleep mode around the paging block due to the overhead of entering and exiting deep sleep and the time used up to perform the other processing.

One of the reasons the phone must wake-up from deep sleep other that for a layer 1 event is for an operating system (OS) event. These events can includes a time-of-day update to a display of the communication device, network communication protocol timers, peripheral interface timers, graphics display updates, and the like. The OS keeps track of the times at which it must perform a time-out related activity for a task (application). These activities include a task timing out waiting for a message, and the expiration of a timer to send a message to a task. For example, when a task has completed all the processing it can do, the task typically makes an application programming interface (API) call to the OS which swaps the task out and tells the OS when to run the task again, which can be when the task is sent a primitive (e.g. a message from another task) or after a fixed amount of time. The message itself can be sent to the task from another task or from an interrupt service routine. These activities are not synchronized to each other or to a layer1 communication event. The OS must set a timer to ensure that a particular task runs at the required time to perform the event. Therefore, an OS timer can cause the radiotelephone to need to be awake when the radiotelephone could otherwise be sleeping. The OS sets a hardware periodic interrupt timer (PIT) to the earliest overall value for all the OS timer events, which wakes the system from deep sleep. As a result, the communication device enters and exits sleep mode many times, asynchronously from those times required to enter and exit sleep mode for layer 1 communication tasks.

Accordingly, there is a need for a method for controlling entrance to and exit from a sleep mode in a communication device. There is a further need to reduce the frequency of entering and exiting deep sleep by getting as much done as possible while out of deep sleep and then remaining in deep sleep as long as possible.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

The present invention describes a method to control entrance to, and exit from, a sleep mode in a communication device. In particular, the present invention combines processing activities together to perform them during one wake-up period rather than waking up several times, once for each activity. Current drain in the communication device is thereby lowered by synchronizing processing tasks together to be performed during the wake-up period, to read the paging block for example.

It is envisioned that the present invention would primarily find use in battery powered communication devices such as cellular radiotelephones. Typically, this involves a radiotelephone system with a plurality of base stations configured for radio communication with one or more mobile stations including a communication device such as radiotelephone or cellular telephone. The communication device is operable by a microprocessor and is configured to receive and transmit signals to communicate with the plurality of base stations (layer 1 events). The radiotelephone system can operate along several technology standards including Code Division Multiple Access (CDMA), Time Division Multiple Access (TDMA), GSM, and other digital radiotelephone systems.

Figure 1:
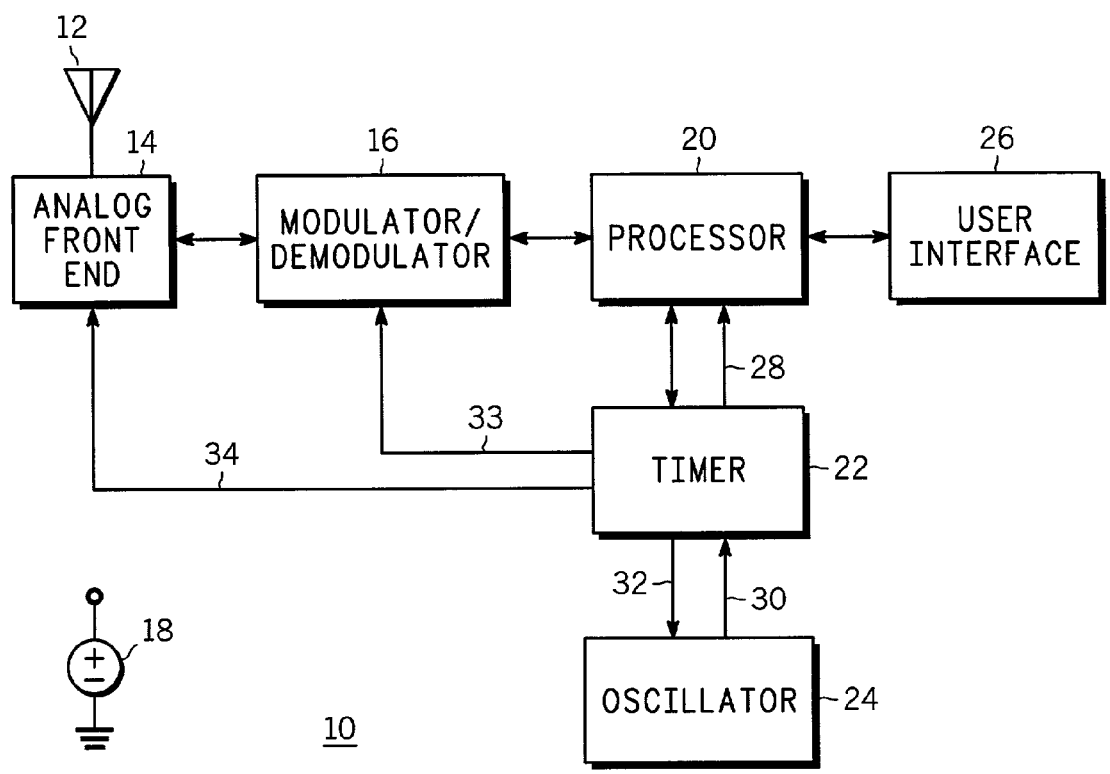
FIG. 1 is a simplified schematic diagram for event coordination, in accordance with the present invention.

FIG. 1 shows a block diagram of a communication device 10, in accordance with the present invention, usable on the radiotelephone systems described above. The communication device 10 includes an antenna 12, an analog front end 14, a modulator/demodulator (modem) 16, a processor 20, a hardware timer 22, an oscillator 24, a user interface 26 and a battery 18. The battery 18 provides operating power to the components of the communication device 10.

The antenna 12 receives RF signals from a base station or base stations in the radiotelephone system. Received RF signals are converted to electrical signals by the antenna 12 and provided to the analog front end 14. The analog front end 14 includes an RF portion including circuitry such as a receiver and transmitter, which can be powered down in sleep mode to save battery power. The analog front end 14 filters the signals and provides conversion to baseband signals. These analog baseband signals are then provided to the modem 16, which converts the signals to streams of digital data for further processing by the processor 20 to provide the information contained in the signal to a user through the user interface 26, such as a speaker, display, and the like. This sequence is essentially reversed for transmission of signals from the communication device to the base station or base stations.

The processor 20 controls the functions of the communication device 10. The processor 20 runs an operating system that operates in response to stored programs of instructions and includes a memory for storing these instructions and other data. The processor 20 has a clock input 28 for receiving a clock signal from the timer 22. The processor can also respond to interrupt signals generated internally or from the user interface 26 or signals from the base station. In addition, the processor 20 receives from the base station the interval on which the communication device 10 must look for pages. Over this prescribed interval, the communication device monitors a paging channel of the radiotelephone system for a predetermined time and can be in sleep mode for the remainder of the time. The processor 20, under timing control from the timer 22, coordinates the events in the communication device 10 required for entry into and exit from sleep mode. Such events include keeping track of system time, restarting the oscillator 24, enabling power to the RF portion of the analog front end 14, and the clocking of the modem 16. For example, when the timing signal is removed from the modem 16, the modem 16 enters a low power mode and all internal states are frozen. The processor 20 is coupled to other elements of the communication device 10, as should be recognized. Such connections are not shown in FIG. 1 so as to not unduly complicate the drawing figure.

The user interface 26 permits user control of the operation of the communication device 10. The user interface 26 typically includes a display, a keypad, a microphone and an earpiece or speaker. The user interface 26 is coupled to the processor 20. The timer 22 controls timing of the communication device 10. In particular, the timer 22 controls entry to and exit from sleep mode by the communication device 10 and synchronization of local timing of the communication device 10 and system timing of the radiotelephone system being used. The timer 22 has a clock input for receiving a clock signal 30 from the oscillator 24.

The oscillator 24 is a reference oscillator for generating a reference clock signal. In the illustrated embodiment, the oscillator 24 is a fine resolution clock that produces a highly accurate, fine resolution clock signal such as a 16.8 MHz clock signal. The timer 22 has a control output for providing a control signal 32 to the oscillator 24. In response to the control signal, the oscillator 24 is selectively activated and inactivated. When inactivated, the oscillator 24 enters a low power mode. The timer 22 further provides a control signal 34 to the analog front end 14. In response to this control signal, a portion of the analog front end 14 is selectively powered down.

In the sleep mode, the timer 22 simulates system timing until end of the sleep duration determined by the processor 20 using a coarse resolution clock signal, as is known in the art. The processor 20 determines timing of one or more events for reactivating the communication device 10 from sleep mode. The reactivation time includes some delays. In particular, the processor calculates an enable oscillator time for restarting the oscillator 24, and a warm-up time for reactivating the RF portion of the analog front end 14. Normally, it takes a longer amount of time to power up devices of the radiotelephone than it does to power down those devices, i.e. enter sleep mode. In a preferred embodiment, the present invention is applied to a GSM radiotelephone wherein the wake-up process for layer1 communication events is controlled by a Deep Sleep Module (DSM) timer (shown as 22 in FIG. 1). Although one timer is shown for simplicity there can be separate timers for the OS timer events and the layer 1 communication events.

One novel aspect of the method of the present invention involves associating an accuracy value with OS timer events. Typical OS timer events are time-of-day updates to a display or user interface, network communication protocol timers, peripheral interface timers, graphics display updates, and the like. For example, in regards to a graphics display update, the operating system periodically needs to update the display as new information is presented. In this case, it might be acceptable to delay display screen updates for one second, for example, without unduly inconveniencing a user. Therefore, an accuracy value of one second can then be assign to the OS event of graphic display update. The same accuracy can be applied to all OS events. More preferably, different accuracy values can be assigned for each OS event.

In particular, the OS begins system operation with a default accuracy value associated with each OS timer event. This is stored in a memory register (not shown). The accuracy value specifies how much delay is acceptable from the original "raw" OS event time specified during run-time when the OS timer event is created. The delay is the time from the raw OS event time until the time the OS event hardware timer generates an interrupt to the OS allowing the OS to check the OS timer event list and perform the OS event task. To change the accuracy value associated with any timer event, a call can be made to an OS Application Programming Interface (API) or similar routine. The API then modifies a table entry that holds the associated accuracy value for the OS timer event. Note that the raw OS timer event values themselves are not modified by this API call, only the associated accuracy value is changed. A single associated accuracy value can be used for all OS timer events created by a particular task, or a separate accuracy value can be used for each timer event. For example, a task could make the API call specifying that it can tolerate a two second inaccuracy on it's OS timer events. Any new OS timer event that the task creates would then have a two second accuracy (i.e. can accept a two second delay before performance). Therefore, the OS hardware timer event interrupt could be delayed from happening by up to two seconds from the raw time-out value specified when the OS timer event was created. An example of a newly created OS timer event could be a task waiting for a message with an associated time-out value.

It should be noted that all events have a priority associated with them. For example, layer 1 communication events and hardware interrupts have a higher priority than OS events or tasks. As a result, if any two events are set to occur at the same time, the higher priority event takes precedence and the lower priority event (typically an OS event or task) is temporarily suspended until the higher priority event is completed. At that time the suspended task can be completed. At the end of any interrupt, event or task, the OS is called to check when the next event is scheduled to occur. If there is not enough time before the next scheduled event to enter sleep mode (i.e. not enough time to power down components and then power up components) then the components of the device will remain powered up. Although different components and powering times are needed for different event (e.g. layer 1 communication events typically take longer to wake-up than OS events), these powering times typically are known, and the OS can calculate whether there is sufficient time between events to enter sleep mode. If there is sufficient time for sleep mode, the OS writes the time to wake-up for the next scheduled event into the hardware timer. It should also be noted that the time to completion of any particular task is not known by the OS. Therefore, the OS can only schedule predetermined start (wake-up) times for any particular event or task.

Figure 2:
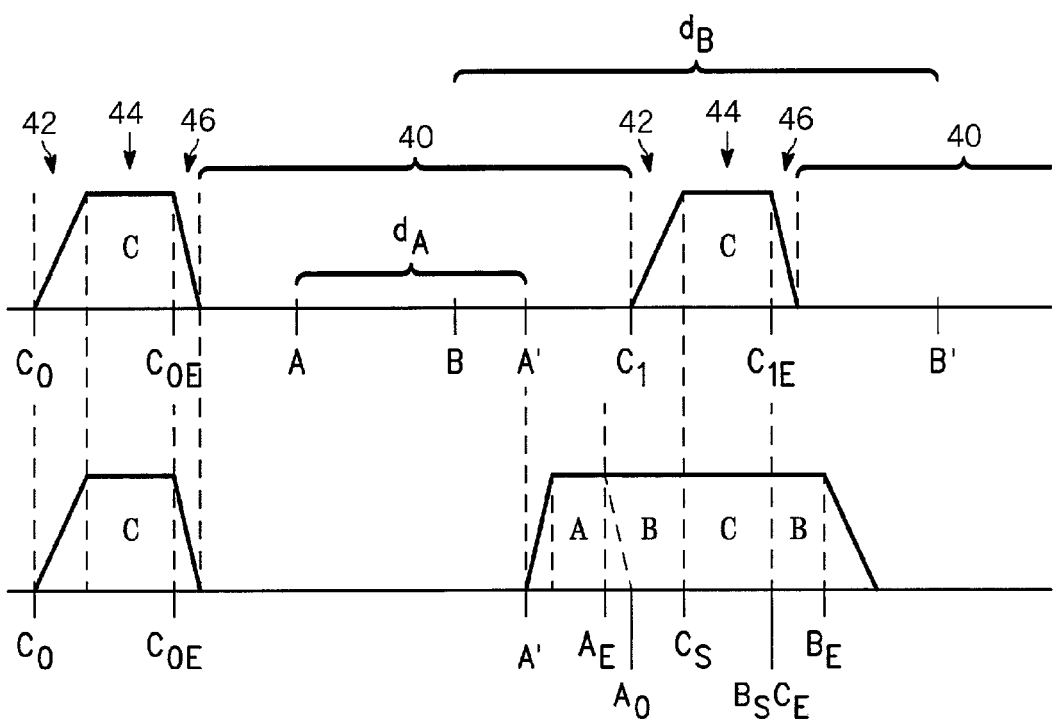
FIG. 2 is a timing diagram for event coordination, in accordance with the present invention.

FIG. 2 shows an example of the timing adjustments provided by the present invention, where increasing time is to the right and increasing current drain in the device is upwards. Fixed events C (e.g. layer 1 communication events in a radiotelephone communication system) must occur at periodic intervals at fixed times: $C_0$, $C_1$, etc. Similarly, there can be other events, such as hardware interrupts or even some OS tasks, that must occur at fixed times. Any of these fixed-type events can be represented by the fixed events C. In the example below the fixed events, C, are layer 1 communication events in a radiotelephone, for example. However, the present invention is also applicable to other fixed events such as hardware interrupts within a computer or bus communication events between a computer and peripheral or other electronic device.

If the electronic device, such as a radiotelephone, is not already awake, performing an event or task involves leaving a sleep mode period 40, entering a power-up period 42, and entering the wake-up period 44 to perform the communication. After the communication is complete the radiotelephone can then power-down components during a power-down period 46 before re-entering sleep mode 40. The default sleep modes are timed to be in-between the fixed periodic communication events, which cannot be altered since these must be synchronized with an external device or radio communication system.

Just before the components of the electronic device enters sleep mode, sleep program code writes a time value into the hardware timer telling it when to wake-up for the next fixed (layer 1 communication) event. An OS API routine is also called with this time parameter passed to it so that the OS API knows when the next fixed event will be. (In a system with no equivalent fixed event or hardware timer, a no time-out value would be passed). Performance of OS events (e.g. A, B, etc.) also requires that the electronic device exit a sleep mode, if it is presently in a sleep mode. This is similar to the powering operation for communication events described above but may involve the powering of different or additional components of the electronic device or radiotelephone. However, in both cases the processor is used for OS and fixed (communication) events. Therefore, OS and fixed events must be handled sequentially and not concurrently. In addition, a layer 1 communication event has priority over OS tasks or events when there is a conflict. Once any event is completed the electronic device can be placed back into the sleep mode if there is no immediately following event.

The OS schedules beginning OS events times (A, B) as raw event times in a list. The OS is unaware how long these tasks might take. In accordance with the present invention, an accuracy value is associated with each of the raw event times in the list, as described previously. Each item in the list also has an associated priority. The accuracy value for each event defines a range of permissible times to start that event. For example, if an OS event is set to occur at raw time A, and that event has an associated accuracy value of $d_A$, then the present invention can allow the event to take place anywhere within the time period A to A', where A'=A+$d_A$. The fuzzy event time for the event set to occur at time A is A'. Similarly, B'=B+$d_B$, where $d_B$ can be different than, or the same as, $d_A$, as described previously. It may also be that any particular accuracy delay time, $d_i$, for an event can be zero, which means that event is a fixed time event and is treated the same as a layer 1 communication event, for example, albeit with a lower priority.

To define the list of fuzzy event times, and subsequent power-up periods, sleep program code calls an OS API which makes several timing checks at the termination of any particular interrupt. First, the OS API checks the raw event times, A, B, etc., for all the OS timer events set to occur up until the next fixed event time, $C_1$ for example. In the example shown, raw OS events A and B are set to occur before the next layer 1 event, $C_1$. Next, the OS API checks the associated accuracy value of those event times and adds the associated OS timer accuracy value to the raw OS timer time for each OS timer event occurring before the next fixed event time. For example, the first OS event A may have an accuracy value, $d_A$, of one second such that the latest it can start would be A'=A+3, and the second event may have an accuracy value, $d_B$, of two seconds such that the latest it can start would be B'=B+7. These are the latest times that these respective OS events can begin, and are their fuzzy times. Note that the API is only concerned with the beginning of events or tasks, and does not know how long these events or tasks can last. Next, the OS API then determines which resulting OS timer event must occur earliest in time by determining which OS event has the earliest fuzzy time. Continuing the example, if event A has a time of 10 and event B has 12, A' is 13 and B' is 19 so that event A has the earliest fuzzy wakeup time of 13. The OS event hardware timer is then set to this earliest OS event time as this is the earliest time for waking-up. Note that the accuracy calculation is done only for the purpose of determining the earliest value which must be written to the OS hardware timer. The original desired execution time for the event is not changed. In the figure shown, OS event A must occur earlier than OS event B, since A' is less then B'. If event B were a fixed time event (i.e. no accuracy delay) then event B must occur before event A.

The system then powers down (commanded at time $C_{0E}$). The system will then wake-up either at the time A' or at the time of the fixed layer 1 communication event, whichever is earlier. Continuing this example, we will assume A' is earlier than the fixed layer 1 communication event time. On wake-up (at time A'), the system powers up the necessary components and begins to perform task A. At the end of task A (at time $A_E$) the OS checks the timer events to see if any have expired (i.e. the raw event time has passed). If any have expired the API will run those expired events in order of highest priority, as predetermined by the OS, and waits to run any events that have not expired. Any events with conflicting times are also run in order of highest priority. The OS doesn't consider timer accuracy values when making this check since the accuracy values are only used when setting the hardware wakeup timer for the earliest event, and the goal of their use is only to delay the wakeup from deep sleep. The OS schedules the next event to occur based on the raw value of each OS timer event. The scheduling that the OS performs includes setting the OS hardware timer to the raw value of the next OS timer event.

In the example of FIG. 2, at the end of task A (at time $A_E$), control is passed to the OS. The OS calls the timing check API which sees that the raw event start time B has expired, and the event time for fixed task C (at time $C_1$) has not expired. Therefore, the OS subsequently starts to run task B. However, fixed event C has a higher priority than OS task B, and subsequently suspends the performance of task B (should it run too long) until task C is completed, at time $C_E$. The OS then runs at the end of task C and sees that task B is not completed and continues task B at time $B_S$ until task B is completed, at $B_E$, where the OS runs again, sees no expired events, and calls the sleep program code which repeats the sleep mode preparation procedure which includes calculating and assigning wake-up times to the hardware timer for the next fuzzy OS event and layer1 communication fixed event.

Preferably, the sleep program code also checks to see if the powering down time of the last event overlaps the powering up time of the next event. The powering-down and powering-up times are typically known for each event. In a case of overlap, the device is not allowed to sleep but stays awake until the next scheduled event. In the example show in FIG. 2 (and assuming that there is no task B) at the end of task A (at time $A_E$) the shutdown API is called and calculates that the time to shutdown, $A_O$, overlaps the time to power up for event C (at time $C_1$). Therefore, the shutdown API prevents powering down the device even though there may be some operational idle time between times $A_E$ and $C_S$.

In summary, at the end of a wake-up event, the operating system reviews all raw event times and executes any event whose raw event time has passed by in order of priority. As a result, the present invention provides the grouping together of tasks to avoid repeated powering down and powering up operations, thereby conserving current drain during those powering down and powering up operations. There is the added advantage of delaying events wherever possible, so that any unexpected interrupt that occurs has the opportunity to be combined with a delayed task.

It should be noticed that the concept of the present invention, as considered in terms of a "fuzzy" timer, can be viewed in two ways, but with the same implementation described above. For example, a particular time set to perform an OS event can be described in terms of that particular time plus-or-minus a specific accuracy value (e.g. a range of time $t_1$ plus-or-minus 1 second), or it can be described in terms of beginning and ending values (e.g. a range of from $t_1-1$ to $t_1+1$). In either case, the same allowable fuzzy time period is described. In practice, the OS will determine the raw event times, which are stored in memory, and the method of the present invention adds an associated accuracy value stored along with the raw time. The timer can use the raw event time and add and subtract the accuracy value to find a range of the earliest and latest possible times to perform the OS event. For example, the raw time can be T with an accuracy of A, and the range would then be from time T−A to T+A. Alternatively, either the OS or the timer can modify the raw event time to be the earliest possible time and the accuracy value to define the latest possible time. For example, the raw time would already be T−A and the accuracy would be 2A, which when added to the raw time gives the same time range as before. Either operation would be transparent in terms of the functionality of the present invention.

Figure 3:
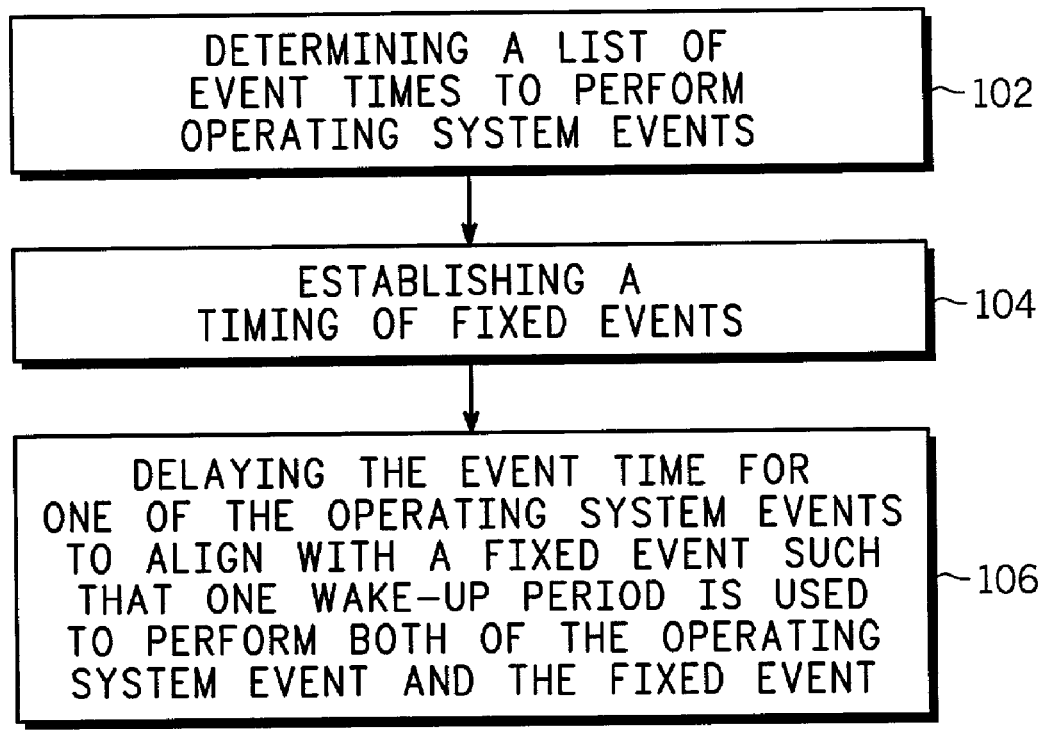
FIG. 3 is a flow chart outlining a method for event coordination, in accordance with the present invention.

The present invention incorporates a method 100 for event coordination, as shown in FIG. 3. The method primarily applies to microprocessor-based electronic devices having a sleep mode, but can be applied to communication devices. It can be assumed the electronic device is first placed in sleep mode. The method includes a first step 102 of determining a list of event times to perform associated operating system events that require exiting sleep mode and entering a wake-up period to perform the event tasks. A next step 104 includes establishing a timing of fixed events wherein the electronic device exits the sleep mode and enters a wake-up period to perform the fixed events. Preferably, the fixed events are layer 1 communication events in a communication device. A next step 106 includes delaying the interrupt time for at least one of the operating system events to align with a fixed event such that the electronic device utilizes one wake-up period to perform both of the at least one of the operating system event and the fixed event. Preferably, the method includes a further step of defining accuracy values for each associated operating system event time, where the accuracy values define an acceptable delay to apply in the delaying step 106.

The delaying step can be broken down into substeps of: a) determining if any of the event times are set to occur before the next fixed event; b) adding, for those event times of the previous step, the event times plus their associated accuracy values to provide delayed event times; c) calculating which of the operating system events delayed event times occur earliest in time; and d) setting a wake-up period for the operating system at the delayed event time of the previous step. Subsequent steps can be waking up the electronic device at the delayed event time set in the setting step, running an associated task at the delayed event time; and calling a shutdown routine at the completion of the running step. The shutdown routine performs the substeps of: checking to see if any of the events have expired and performing those expired events; scheduling the next event to occur; and shutting down components of the electronic device. Preferably, the checking substep includes checking to see if a powering down time after the task overlaps a powering up time for the next event. If this occurs, the components of the electronic device are kept powered up until the next event, and the shutting down step does not occur.

In practice, multiple timers are used. Therefore it is beneficial if the method includes a step of providing an operating system timer to time the operating system event interrupt times.

In summary, the overall result is that multiple OS timer based wake-up periods can be grouped together in a single wake-up period that can also be combined with a layer 1 communication event wake-up period. This results in a lower total number of times for exiting and entering sleep mode, subsequently lowering current consumption. As can be seen from the foregoing, the present invention provides a method for coordinating events in a communication device to reduce current drain. Prior to entering a low power sleep state, the communication device calculates the time to wake up and other intermediate times corresponding to wake up events. These include the time to restart an oscillator, the time to activate RF circuitry and the time to start clocking a modem. Also, during sleep mode, a sleep timer simulates system timing to provide an indication when to exit sleep mode. Duration of the sleep mode is timed using a coarse resolution clock signal. At the end of the sleep mode, local timing is precisely aligned with system timing using the fine resolution clock signal from the oscillator.

The invention could be implemented in all wireless/cordless phone products and portable computing devices such as PCs and PDAs to improve battery life and simplify software architecture. In particular, the invention would find benefit in all battery operated products that use an operating system and a low power mode in which the current drain cost of entering and exiting the low power mode is significant. The invention is not limited to communication devices as OS events can still be grouped together saving wake-up calls, without the need to coordinate wake-up periods with communication events.

While the invention has been described in detail above, the invention is not intended to be limited to the specific embodiments as described. It is evident that those skilled in the art may now make numerous uses, modifications of, and departures from the specific embodiments described herein without departing from the inventive concepts.

What is claimed is:

1. A method of coordinating events in a microprocessor-based electronic device having a sleep mode, the method comprising the steps of:
   determining a list of event times to perform associated operating system events that require exiting sleep mode and entering a wake-up period to perform the event tasks;
   establishing a timing of fixed events wherein the electronic device exits the sleep mode and enters a wake-up period to perform the fixed events; and
   delaying the event time for at least one of the operating system events to align with a fixed event such that the electronic device utilizes one wake-up period to perform both of the at least one of the operating system event and the fixed event.

2. The method of claim 1, further comprising a step of defining accuracy values for each associated operating system event time, where the accuracy values define an acceptable delay to apply in the delaying step.

3. The method of claim 2, wherein the delaying step includes the substeps of:
   determining if any of the event times are set to occur before the next fixed event;
   adding, for those event times of the previous step, the event times plus their associated accuracy values to provide delayed event times;
   calculating which of the operating system delayed event times occur earliest in time; and
   setting a wake-up time for the operating system at the delayed event time of the previous step.

4. The method of claim 3, further comprising the steps of:
   placing the electronic device in sleep mode;
   waking up the electronic device at the delayed event time set in the setting step;
   running an associated task at the delayed event time; and
   at the completion of the running step, performing the substeps of:
     checking to see if any of the events have expired and performing those expired events;
     scheduling the next event to occur; and
     shutting down components of the electronic device.

5. The method of claim 4, wherein the checking substep includes checking to see if a powering down time after the task overlaps a powering up time for the next event, upon which the components of the electronic device are kept powered up until the next event.

6. The method of claim 1, further comprising a step of providing an operating system timer to time the operating system event times.

7. The method of claim 1, wherein in the establishing step the fixed events are layer 1 communication events, and the electronic device is a radiotelephone.

8. A method of coordinating events in a microprocessor-based communication device having a sleep mode, the method comprising the steps of:
   providing an operating system timer to time operating system event times;
   determining a list of event times to perform associated operating system events that require exiting sleep mode and entering a wake-up period to perform the event tasks;
   defining accuracy values fur each associated operating system event times, where the accuracy values define an acceptable delay to apply in the delaying step;
   establishing a timing of communication events wherein the communication device exits the sleep mode and enters a wake-up period to perform the communication events; and
   delaying the event time for at least one of the operating system events to align with a communication event such that the communication device utilizes one wake-up period to perform both of the at least one of the operating system event and the communication event.

9. The method of claim 8, wherein the delaying step includes the substeps of:
   determining if any of the event times are set to occur before the next communication event;
   adding, for those event times of the previous step, the event times plus their associated accuracy values to provide delayed event times;
   calculating which of the operating system delayed event times occur earliest in time; and
   setting a wake-up period for the operating system at the delayed event time of the previous step.

10. The method of claim 9, further comprising the steps of:
    placing the communication device in sleep mode;
    waking up the communication device at the delayed event time set in the setting step;
    running an associated task at the delayed event time; and
    at the completion of the running step, performing the substeps of:
      checking to see if any of the events have expired and performing those expired events,
      scheduling the next event to occur; and
      shutting down components of the communication device.

11. The method of claim 10, wherein the checking substep includes checking to see if a powering down time after the task overlaps a powering up time for the next event, upon which the components of the communication device are kept powered up until the next event.

12. The method of claim 8, wherein in the establishing step the communication events are layer 1 events in a GSM operating system.

13. A method of coordinating events in a microprocessor-based communication device having a sleep mode, the method comprising the steps of:

providing an operating system timer to time operating system event times;

determining a list of event times to perform associated operating system events that require exiting sleep mode and entering a wake-up period to perform the event tasks;

defining accuracy values for each associated operating system event time, where the accuracy values define an acceptable delay to apply in the delaying step;

establishing a timing of communication events wherein the communication device exits the sleep mode and enters a wake-up period to perform the communication events; and determining if any of the event times are set to occur before the next communication event;

adding, for those event times of the previous step, the event times plus their associated accuracy values to provide delayed event times;

calculating which of the operating system delayed event times occur earliest in time; and setting a wake-up period for the operating system at the delayed event time of the previous step such that the communication device utilizes one wake-up period to perform both of the at least one of the operating system event and the communication event.

14. The method of claim 13, further comprising the steps of:

placing the communication device in sleep mode;

waking up the communication device at the delayed event time set in the setting step running an associated task at the delayed event time; and at the completion of the running step, performing the substeps of:

checking to see if any of the events have expired and performing those expired events;

scheduling the next event to occur; and shutting down components of the communication device.

15. The method of claim 14, wherein the checking substep includes checking to see if a powering down time after the task overlaps a powering up time for the next event, upon which the components of the communication device are kept powered up until the next event.

16. The method of claim 13, wherein in the establishing step the communication events are layer 1 events in a GSM operating system.

* * * * *